United States Patent
Pronk et al.

(10) Patent No.: US 6,967,968 B2
(45) Date of Patent: Nov. 22, 2005

(54) COMMUNICATION NETWORK HAVING MINIMIZED ROUNDTRIP CONTENTION DELAY

(75) Inventors: Serverius Petrus Paulus Pronk, Eindhoven (NL); Ludovicus Marinus Gerardus Maria Tolhuizen, Eindhoven (NL); Ewa Barbara Hekstra-Nowacka, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 895 days.

(21) Appl. No.: 09/730,655

(22) Filed: Dec. 6, 2000

(65) Prior Publication Data

US 2003/0198248 A1    Oct. 23, 2003

(30) Foreign Application Priority Data

Dec. 9, 1999 (EP) .................................. 99204223

(51) Int. Cl.⁷ .......................................... H04L 12/413
(52) U.S. Cl. ...................................... 370/447; 370/461
(58) Field of Search ............................. 370/445, 447, 370/448, 458, 461, 462

(56) References Cited

U.S. PATENT DOCUMENTS

| | | | |
|---|---|---|---|
| 5,956,338 A * | 9/1999 | Ghaibeh .................. | 370/236.2 |
| 5,966,163 A | 10/1999 | Lin et al. ...................... | 348/12 |
| 5,978,382 A | 11/1999 | Citta et al. ................. | 370/443 |
| 6,181,687 B1 * | 1/2001 | Bisdikian ..................... | 370/347 |
| 6,243,364 B1 * | 6/2001 | Pihlaja ........................ | 370/294 |
| 6,404,750 B1 * | 6/2002 | Wicker et al. .............. | 370/329 |
| 6,529,520 B1 * | 3/2003 | Lee et al. ................... | 370/442 |
| 6,546,017 B1 * | 4/2003 | Khaunte ...................... | 370/412 |

FOREIGN PATENT DOCUMENTS

| | | | |
|---|---|---|---|
| EP | 0462572 A2 | 12/1991 | ............ H04Q 7/04 |
| EP | 0621708 A2 | 10/1994 | ............ H04L 12/28 |
| WO | WO9710655 | 3/1997 | ............ H04J 3/17 |
| WO | 99/00931 | 1/1999 | |

OTHER PUBLICATIONS

Mitrou et al., "a reservation Mutplie Access Protocol for Microcellular Mobile-Communication Systems", IEEE Transactions of Vehicular Technology, US, IEEE Inc, NY, vol. 39, No. 4, Nov. 1990, pp. 340-351, XP000173255.

* cited by examiner

Primary Examiner—Min Jung

(57) ABSTRACT

A communication network comprises a head-end and a plurality of network terminations coupled thereto through a shared communication channel, which is accessed by a protocol having one or more dedicated slots wherein upstream data cells are contained, which may collide in a transmission wherein two or more network terminations try to access the shared communication channel practically simultaneously. Herein the protocol is arranged such that the one or more dedicated slots precede the moment whereon the first next downstream transmission is started to be prepared by the head-end. In that case actual information in the dedicated slots can be fed back without substantial delay to the network terminations in order to provide them by return with actual contention information.

12 Claims, 1 Drawing Sheet

COMMUNICATION NETWORK HAVING MINIMIZED ROUNDTRIP CONTENTION DELAY

BACKGROUND OF THE INVENTION

The present invention relates to a communication network comprising a head-end and a plurality of network terminations capable of communicating through a shared communication channel, whereby occasionally contending network terminations try to communicate by simultaneously accessing one or more dedicated slots in upstream communication to the head-end.

The present invention also relates to a protocol for application in the communication network.

Such a communication network is known from WO 99/00931. The known communication network comprises a network hub or head-end and a plurality of network terminations having transmitters/receivers and shared communication channels. Downstream communication from head-end to one or more terminations or upstream communication from one or more terminations to the head-end are made possible by a communication protocol, such as the ALOHA protocol. In particular a flex slotted ALOHA communication protocol is described therein, whereby communication is arranged in consecutive time slots forming a frame. Such a frame comprises data slots containing data cells having information to be transmitted, either downstream, or upstream and dedicated slots containing data cells sent upstream. Such a data cell may for example comprise a reservation request, wherein a termination requests permission from the head-end to transmit upstream data cells in the data slots. If however more than one network termination request permission for communication and they do this within the same dedicated slot or slots then a collision arises therein. In order to resolve this contention between colliding network terminations a retransmission has to be provided for such that the requests do no longer collide. For this situation a protocol generally employs some kind of contention resolution algorithm (CRA) to effect a retransmission of the requests in different dedicated slots. This situation may however lead to a considerable accumulation of processing and communication delays, such that the resolution of the collision may take a considerable amount of time, which reduces the performance of the known communication network.

SUMMARY OF THE INVENTION

Therefore it is an object of the present invention to provide a communication network and protocol reducing the necessary collision resolution time.

Thereto the communication network according to the invention is characterized in that the head-end is arranged such that the receipt of the dedicated slots by the head-end precedes the moment in time whereon the head-end starts preparing a corresponding communication containing contention resolution information.

It is an advantage of the communication network according to the present invention that by properly positioning the dedicated slots—containing upstream data from the network terminations which may be corrupted—before the so called snapshot moment, whereon the next corresponding downstream transmission is started to be prepared by the head-end, the latest actual information respecting a possible contention of network terminations can be returned without undue delay in a downstream transmission to the network terminations. This actual information which in particular concerns collision feedback information is now available to the terminations by return. This saves collision resolution time and improves the performance in the communication network according to the invention. In particular in case the dedicated slots contain request data from an network termination for example asking for access to data slots, in order to communicate data over the shared communication channel, that request can be dealt with swiftly and without unnecessary delay.

Also advantageously the invention is applicable to several existing or emerging standards, such as Digital Video Broadcasting (DVB), Digital Audio-Visual Council (DAVIC) and Data-Over-Cable Service Interface Specifications (DOCSIS). In addition a variety of types of protocols and combinations with either or not ALOHA or tree based (re) transmission and contention resolution protocols are applicable in the communication network according to the invention.

An embodiment of the communication network according to the invention is characterized in that access to the dedicated slots is organized by means of a contention resolution protocol. Advantageously a variety of contention resolution protocols can be used in conjunction with the present invention.

In practice it has been found to be advantageous to have a communication network, which is characterized in that the contention resolution protocol is tree-based, e.g. based on ternary contention-tree resolution.

Further preferred embodiments are set out in the dependent claims, and accordingly the protocol following the invention has the features outlined in claims 8–11.

BRIEF DESCRIPTION OF THE DRAWINGS

At present the communication network and protocol according to the invention will be elucidated further together with its additional advantages while reference is being made to the appended drawing, wherein similar components are being referred to by means of the same reference numerals. In the drawing.

DESCRIPTION OF THE PREFERRED EMBODIMENT

Figure 1:
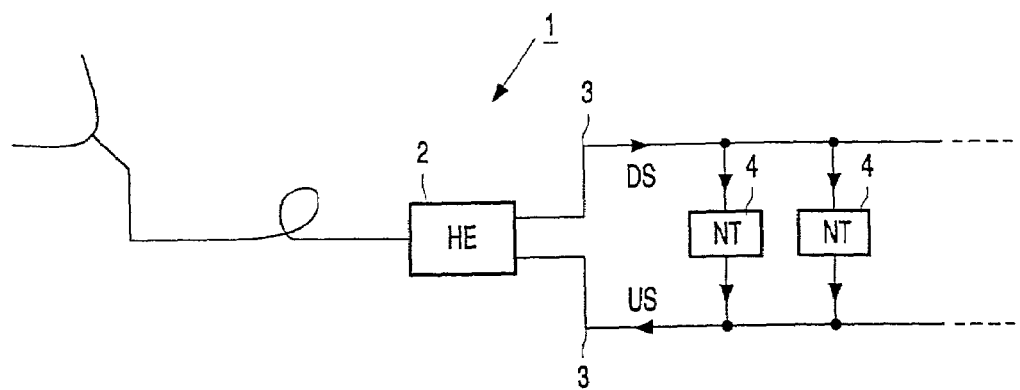
FIG. 1 shows a schematic view of a communication network according to the invention.

FIG. 1 shows a communication network 1, which here has the form of a hybrid fibre/coax (HFC) network, but may for example also be embodied as a satellite network. The network 1 as shown is provided with at least a head-end (HE) 2, sometimes also called a hub, which is coupled through a shared communication channel 3 to several network terminations 4, indicated here as NT. The shared communication channel 3 as shown has an upstream US path and a downstream DS path, here separated from the US path. In a cable network such as a Cable Television (CATV) network for audio and/or video signals the DS path conveys high frequency television and/or radio signals downstream to the NT's of subscribers. In a Local Area Network (LAN), or a Wide Area Network (WAN) data is exchanged between the head-end or server and the NT's, or the NT's mutually via the head-end 2. In case an NT want to transmit data to another NT 4 or to the head-end 2 it accesses the communication channel 3 by making use of a protocol which governs the access and granting of access, as well as the resolution of possible access conflicts, which may arise if two or more NT's access the channel virtually simultaneously. The protocol may for example be a time based protocol, such as some form of the ALOHA protocol (see WO 99/00931, which is included here by reference thereto) or a so called tree-based protocol to be described further. Generally in a protocol particular time slots or groups of time slots are allocated for collision-free data transmission, and others here called dedicated time slots are allocated for requesting data communication. A request is made by one or more NT's. For example a request cell can be inserted in a dedicated slot. The cells in the dedicated slots are transmitted upstream to the head-end 2. The NT putting the request cell in a dedicated slot may be the only NT requesting access to the dedicated slot at that moment, or may incidentally make the request at a point in time, which coincides with a request made by one or more other NT's. In the former case the upstream transmission to the head-end 2 is successful, where after particular data slots are designated to the one requesting NT only. In the latter case the dedicated slot contains corrupted request data, which will be observed by the head-end 2 as a collision. The effect thereof is that a Collision Resolution Algorithm (CRA) comes in operation, wherein data is fed back in downstream direction to the NT's including the mutually conflicting NT's concerned, in order to achieve a retransmission of the requesting NT's. Hopefully thereafter the conflicting NT's retransmit and request allowance for data transmission on a mutually different point in time, such that no collision arises. A variety of algorithms, such as ALOHA-based or tree-based CRA's known in the art can each be applied independently from one another.

Figure 2:
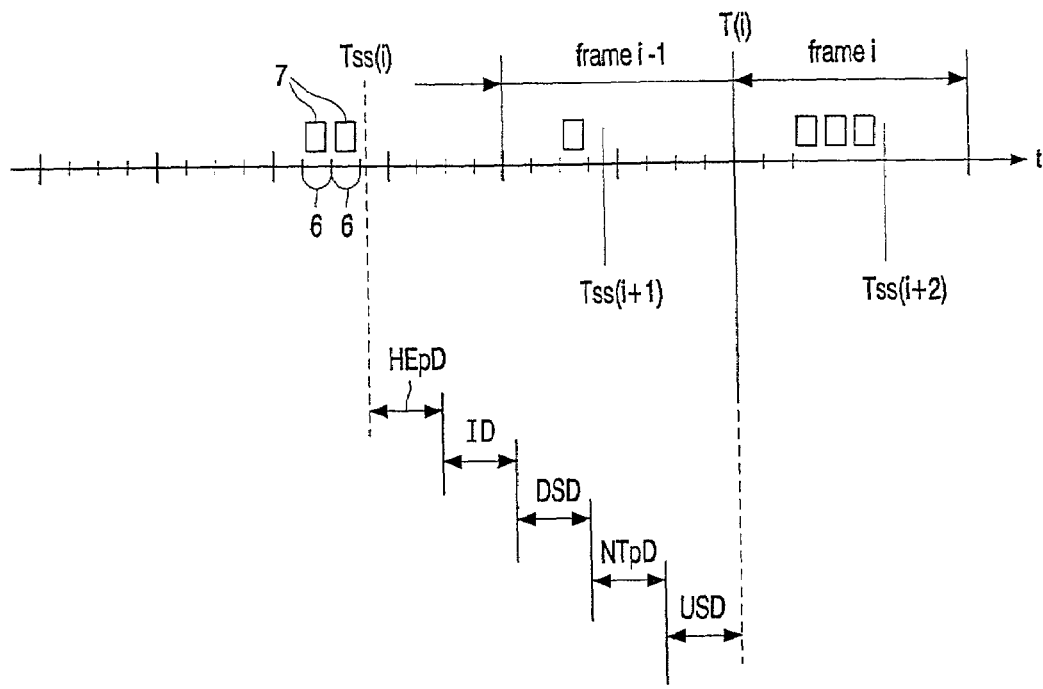
FIG. 2 shows a time diagram for elucidating the protocol according to the invention.

FIG. 2 shows a time diagram indicating the head-end receive time axis t. The dedicated slot containing in particular the possibly corrupted data are received by the head-end 2. At a so called snapshot moment Tss(i) in time the head-end 2 starts preparing a next downstream transmission after receipt of the latest dedicated sets 6', 6'. These most recently received dedicated slots 6', 6' contain the latest updated actual information about an emerging conflict between NT's trying to gain access to the dedicated slots in a way which overlaps at least a part of the dedicated slot content. If now as shown herein the aforementioned snapshot moment Tss(i) appears after the receipt of the latest dedicated slots 6', 6' then the most actual data is available at that moment for feedback to the NT or NT's concerned, such that there is only a minimum roundtrip delay for informing the NT's concerned about a possible collision. This leads to a speed improvement of the contention resolution.

The snapshot moment Tss(i) is related to a moment in time indicated T(i), whereon the head-end 2 commences to receive a sequence of cells belonging together. Generally the communication is frame-based, which is shown in FIG. 2 and each frame i, i-1, i-2 . . . contains slots, wherein data cells may be inserted. It is to be noted that in practice between Tss(i) and T(i) there will exist an aggregation of delays, such as:

processing delay (HEPD), which is the time after obtaining a snapshot of the network state, which is necessary for the head-end 2 to produce the data to be sent to the NT's;

an interleaving delay (ID), which concerns time necessary for dealing with burst errors;

a downstream transmission delay (DSD), which includes a propagation delay through the network 1;

an NT processing delay (NTPD), which is the delay needed by an NT before the actual start of a frame i; and an upstream transmission delay (USD), which indicates the delay incurred before the reception by the head-end of frame i starts.

If in this case the contention tree data are positioned before the snapshot moment, then the resolution of a contention tree is optimized in terms of timing. Future snapshot moments can thus be used to position the dedicated slots in the frame. In the aforementioned DVB/DAVIC standards, ALOHA slots are required to be positioned at the start of each frame i. As a result, contention tree slots tend to be shifted to the end of the frame. The snapshot moment can be used to limit this shift, causing the tree-based contention resolution to proceed faster than when this limit is not used, at a possible small expense of ALOHA performance.

In the specific case wherein the protocol is provided with a ternary tree resolution algorithm such as in Digital Video Broadcast (DVB) standard or similar standards the dedicated slots each consist of three so called mini slots, which may be used to transmit requests. A tree is initiated by transmitting a contention tree (CT) grant to all NT's. This grant is associated with one CT slot, i.e. three mini slots. When an NT decides to transmit a request using CT, it waits for the root of a tree. Then, it chooses randomly one of the three mini slots to transmit its request. The formation of the tree proceeds recursively as follows. For each collision in the tree a sub-tree is initiated in which only those NT's that were involved in the collision are allowed to retransmit their request, in the same way as in the root. If the feedback by the head-end indicates a collision, a unique number accompanying the feedback will be stored by the NT. The NT then waits until it receives a CT grant for the unique number it remembered, that indicates when to retransmit the request.

What is claimed is:

1. A communication network comprising a head-end and a plurality of network terminations capable of communicating through a shared communication channel, whereby occasionally contending network terminations try to communicate by simultaneously accessing one or more dedicated slots in upstream communication to the head-end, wherein the head-end is arranged such that the receipt of the dedicated slots by the head-end precedes, by an aggregation of known delays in the network, the moment in time whereon the head-end starts prepanng a corresponding communication containing contention resolution information.

2. The communication network according to claim 1, wherein access to the dedicated slots is organized by means of a contention resolution protocol.

3. The communication network according to claim 2, wherein the contention resolution protocol is tree-based.

4. The communication protocol according to claim 1, wherein the contention resolution protocol is selected from the group: ALOHA, slotted ALOHA, slotted ALOHA with exponential back-off.

5. The communication system according to claim 1, wherein the slots have a variable time duration.

6. The communication network according to claim 1, wherein the communication takes place by means of an ALOHA protocol or a tree based protocol.

7. The communication network according to claim 1, wherein the head-end is arranged to operate on a frame-by-frame basis.

8. A protocol for application in the communication network comprising a head-end and a plurality of network terminations capable of communicating through a shared communication channel, whereby occasionally contending network terminations try to communicate by simultaneously accessing one or more dedicated slots sent upstream, wherein the protocol is organized such that the receipt of the dedicated slots by the head-end precedes, by an aggregation of known delays in the network, the moment in time whereon the head-end starts preparing a corresponding communication containing contention resolution information.

9. The protocol according to claim 8, wherein the slots have a variable time duration.

10. The protocol according to claim 8 wherein the protocol is an ALOHA protocol or a tree-based protocol.

11. The protocol according to claim 8, wherein the protocol is provided with a contention resolution algorithm.

12. A head-end coupled via a shared communication channel to a plurality of network terminations, whereby occasionally contending network terminations try to communicate by simultaneously accessing one or more dedicated slots in upstream communication to the head-end, wherein the head-end is arranged such that the receipt of the dedicated slots by the head-end precedes, by an aggregation of known delays in the network, the moment in time whereon the head-end starts preparing a corresponding communication containing contention resolution information.

* * * * *